United States Patent

[11] 3,609,301

[72] Inventor John F. Henderson
Essex County, N.J.
[21] Appl. No. 848,271
[22] Filed Aug. 7, 1969
[45] Patented Sept. 28, 1971
[73] Assignee Litton Business Systems, Inc.
Belleville, N.J.

[54] STAR WHEEL RECORD READER HAVING WHEEL TIP ALIGNING MEANS
18 Claims, 19 Drawing Figs.

[52] U.S. Cl. 235/61.11 C, 235/61.11 R, 178/23 A
[51] Int. Cl. G06r 7/04
[50] Field of Search 178/17 A, 17 B, 17 C, 23.1; 235/61.11, 61.111, 61.112, 61.113, 61.114, 61.115, 61.7; 200/46; 340/149

[56] References Cited

UNITED STATES PATENTS

| | | | |
|---|---|---|---|
| 2,938,667 | 5/1960 | Deutsch | 235/61.11 |
| 3,042,299 | 7/1962 | Sherman | 235/61.11 |
| 3,116,409 | 12/1963 | Lohr et al. | 235/61.11 |
| 3,227,860 | 1/1966 | Blodgett | 235/61.11 |
| 3,325,631 | 6/1967 | Onuma et al. | 235/61.11 |

*Primary Examiner*—Thomas A. Robinson
*Attorneys*—Norman Friedman, Stephen E. Feldman, Arthur T. Groeninger, Morris I. Pollack and Philip Furgang

ABSTRACT: Information, in the form of perforations carried by a record card, is gathered by a system which includes an information storage unit housed in proximity to, and for coaction with, a record reader, and a keyboard entry device. The information storage unit magnetically records on tape the information transmitted to it from either the reader or the keyboard. The reader, through the use of star wheels, reads the perforated data one column at a time and transmits same through appropriate logic to the storage unit. The star wheels are mounted in cantilever fashion on first conductive springlike elements which urge the wheels into coaction with the record and the perforations carried thereby. When a star wheel encounters a perforation its springlike element moves into contact with a second conductive element to close a circuit. Said second conductive element is formed to yield when contacted by said first element to insure proper seating of the star wheel in the perforation and subsequent coaction thereof with other perforations. The star wheels are mounted in a stationary manner; while the record, after being laid upon a receiving bed, is moved in an arcuate path and in such a manner that it is locked in its position, sensed by the star wheels, returned to its initial position, and subsequently ejected from the reader. If the data sensed is unacceptable to the logic the record remains on the reading bed as an indication thereof. The operator, thereafter can enter the data through the intermediary of the keyboard entry device.

INVENTOR
JOHN HENDERSON
BY
ATTORNEY

INVENTOR
JOHN HENDERSON
BY
ATTORNEY

INVENTOR
JOHN HENDERSON
BY
ATTORNEY

INVENTOR
JOHN HENDERSON

BY

ATTORNEY

INVENTOR
JOHN HENDERSON
BY
[signature]
ATTORNEY

INVENTOR
JOHN HENDERSON
BY
ATTORNEY

INVENTOR
JOHN HENDERSON
BY
ATTORNEY

INVENTOR
JOHN HENDERSON
BY
ATTORNEY

INVENTOR
JOHN HENDERSON
BY
ATTORNEY

INVENTOR
JOHN HENDERSON
BY
ATTORNEY

STAR WHEEL RECORD READER HAVING WHEEL TIP ALIGNING MEANS

BACKGROUND OF INVENTION

Field of Application

This invention relates to information gathering systems and the component units thereof, and more particularly to a system and record reading unit for gathering information from a plurality of discrete information bearing records onto a unitary record.

BACKGROUND OF INVENTION

Prior Art

Records bearing machine readable indicia are in use everywhere today. They are carried by people in the form of credit cards, by goods as they move through wholesale and retail establishments, and by materials as they are being processed through the various phases of manufacturing and distribution. If a sufficient number of these records are gathered at a particular location (such as a checkout in a retail establishment, a shipping desk at a distribution center, or a work station in a factory) it may also be convenient and more economical to have at such location equipment for processing the data therefrom. However in many instances the data processing equipment can process data in quantities far in excess of that gathered at any particular location and operation of the equipment under such a condition then becomes economically infeasible.

Quite often the data gathering locations are provided with a record reader connected either by direct wire of telephone line to a central appropriately processing center. The direct wire or telephone line is expensive, and devices so connected to a number of satellite information gathering readers must be provided information has complex and up time sharing or sampling equipment. In the alternative there are some systems where information is gathered from discrete records as they become available, and re-recorded onto a continuous record in the form of a tape (either magnetic, optical or perforate) for subsequent transmission by mail, messenger or communication line to central data processing centers.

While the indicia carried by the record may take any one of many forms (optical, conductive, magnetic, perforate) perforate indicia seems to be the most commonly used. However, perforate indicia reading equipment which is accurate enough to be reliable is usually so expensive and cumbersome to operate as to make its utilization at a data gathering location economically infeasible. On the other hand the presently available equipment which is simple enough to operated and which has a price which does not place it outside the realm of economic feasibility is so unreliable as to make its use impracticable.

Perforate indicia readers utilizing electrically conductive brushes, adapted to make contact through the perforations, are subject to considerable wear resulting in improper data reading; while readers utilizing rods adapted to be moved through perforations to contact switches are considerably complex and slow in their operation. Star wheels disposed on pivotally mounted arms spring biased so that the star wheel rest upon the surface of the record and rotates into the perforations are also commonly used to read perforate indicia. In the great majority of star wheel readers when the pivot arm is displaced, due to the star wheel encountering a perforation, an electrical contact associated therewith is closed. The pivot arm, its mounting and the spring bias necessitate the provision of expensive parts and quite often result in sluggish operation. The associated electrical contact systems often result in improper reading of the record; especially if the apertures are in adjacent or closely associated indicia locations.

OBJECTS OF INVENTION

It is therefore an object of this invention to provide an improved system for gathering information from individual records.

It is another object to provide an improved system for gathering information form individual records and for storing said information at the gathering location.

It is still another object to provide an improved system for gathering information from individual records in such a manner that if the information cannot be properly read from the record it can be otherwise stored in proper sequence.

It is yet another object to provide an improved information gathering system for reading and storing information from individual records; which system associates conventionally available units with other units that are simple in construction and operation, inexpensive in cost, and reliable in performance.

It is yet another object to provide an improved information gathering system for reading and storing information from individual records, for providing a positive indication that the information has not been read correctly or cannot be read correctly, and for enabling the information on the record to be readily read by the operator and inserted in proper order through other means.

It is yet another object of this invention to provide an improved record reader.

It is yet still a further object to provide an improved reader for reading indicia from a record by disposing said record upon an arcuate reading bed in such a manner that the record is stiffened and otherwise accurately positioned.

It is yet still another object of this invention to provide an improved reader for reading perforated indicia through the use of star wheels mounted in cantilever manner.

It is yet still another object of this invention to provide an improved reader for reading perforated indicia through the use of cantilever mounted star wheels wherein the cantilever is also conductive to thus minimize the number of parts required.

It is yet still another object of this invention to provide an improved star wheel reader for reading perforated indicia wherein the star wheels are mounted in cantilever fashion on conductive springlike elements and coact with compliant elements so as to insure proper seating of the star wheels for subsequent reading of data.

It is yet still another object to provide an improved star wheel reader wherein the star wheels upon sensing the perforate data effect the closure of electrical contacts and wherein said electrical contacts are constructed to yield during the closure thereof to insure proper seating of the star wheels and reading of successive perforations whether the perforations be spaced, closely proximate, or adjacent to each other.

In carrying out the invention, according to a preferred embodiment, the information gathering system incorporates a conventionally available magnetic tape storage unit housed in proximity to and for coaction with a reader for reading perforate indicia from record carriers inserted one at a time into the reader, and with a keyboard unit permitting operator entry onto the magnetic tape of information additional to that read by the reader or which has not been or cannot be entered by the reader. The record reader utilizes star wheels carried cantilever fashion by first electrically conductive elements which bias the star wheels against the record and which, upon the sensing of a perforation, move into contact with second electrically conductive elements to close selected circuits. The second elements are formed to yield when so engaged to insure proper seating of the star wheels and subsequent proper reading of adjacent perforations. The record reader furthermore incorporates an arcuate configuration to stiffen the record or proper reading without intricate clamping and locating structure; elements to prevent injury to the operator; and mechanism which ejects a properly read record but not an improperly read record while positioning such improper record for ready operator removal. Appropriate electrical circuitry is provided to interconnect the reader, keyboard and recorder and to otherwise provide the needed controls.

Other objects, features, and advantages of the invention in its detailed construction and arrangement of parts will be seen from the above, from the following description of the preferred embodiment when considered in conjunction with the drawings, and from the appended claims.

DESCRIPTION OF PREFERRED EMBODIMENT

For convenience the invention will be described as applied to an information gathering system including a magnetic tape recorder adapted to receive information from either an adding machine or a record reader and wherein the record reader includes a record holder of arcuate configuration which holds a record, having perforate indicia thereon, in a slightly bowed condition and moves same in a direction away from a home position and back. The record so disposed is clamped in position and passed over four banks of sensing sets, one set after the other, two in one direction and two in the other direction, so as to successively encounter and coact with five star wheel operated sets of electrical contacts in each sensing set. A commutator of two banks of twelve pins and three two position cam operated microswitches coacts with the sensing contacts to energize only one set at a time and to direct the output of the sensing contacts to circuitry which will provide an error output when appropriate to prevent operation of a record ejecting mechanism which will otherwise operate automatically to eject the record from the holder when it returns to home position and after it is unclamped. It being understood, nevertheless, that without departing form the invention that the recording may be other than magnetic; that the adding machine may be replaced by any device which can provide for an operator chosen independent input to the recorder; that the record holder need not be arcuate, hold the record in bowed configuration, or pass the record over the sensing sets; that there may be more or less than four banks of sensing sets with more or less than five star wheel operated sets of contacts in each; that the sensing sets need not be actuated one after the other or in one or another direction; that the commutator and its associated switches and circuitry are to be appropriate to the sensing sets and the mode of operation thereof; and that the reader may retain the record instead of ejecting same, storing it when read properly and returning it to home position when not so read.

Figure 1:
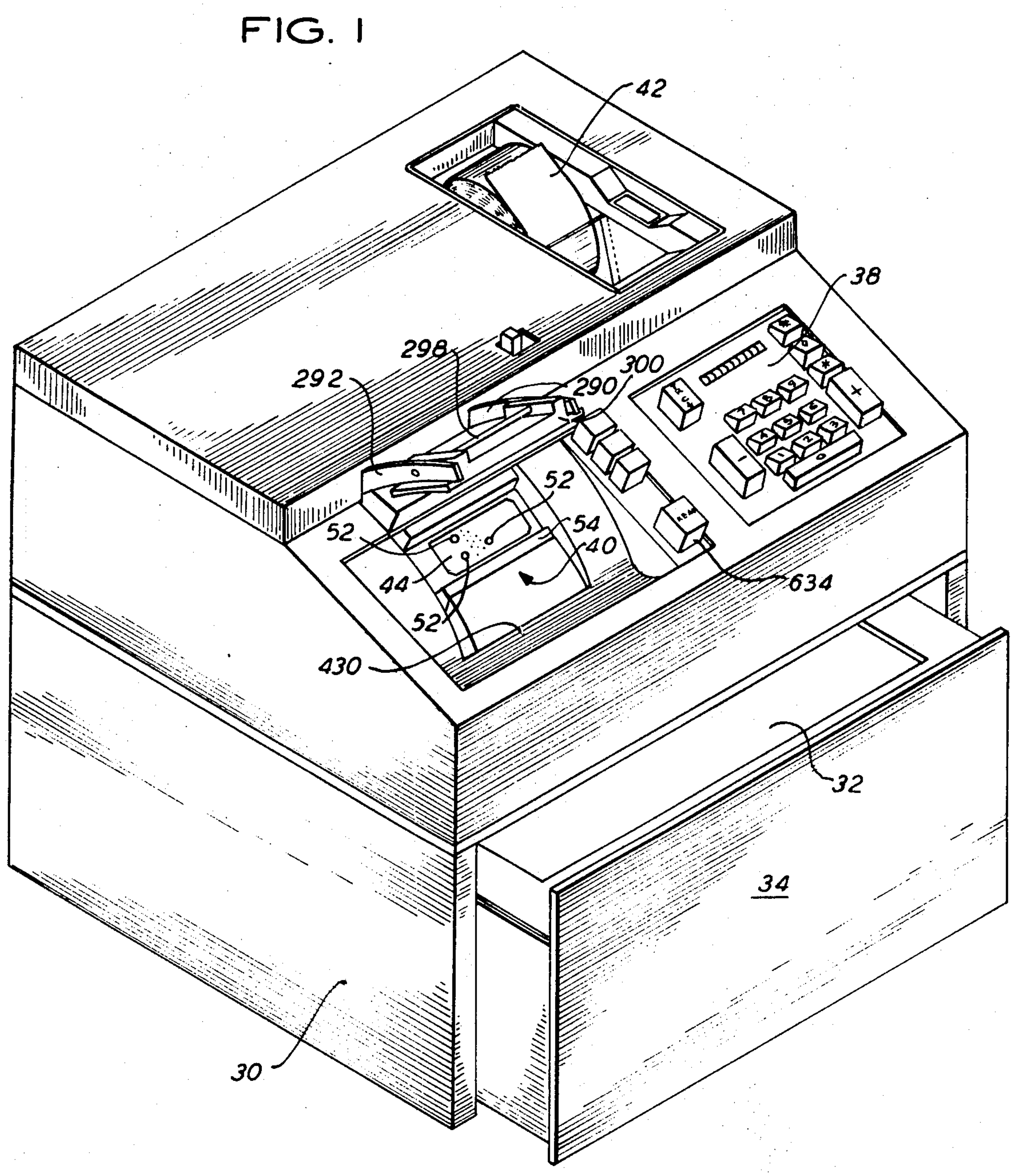
FIG. 1 is an isometric view of an information gathering device embodying the present invention.
Figures 2, 16, 17, 18:
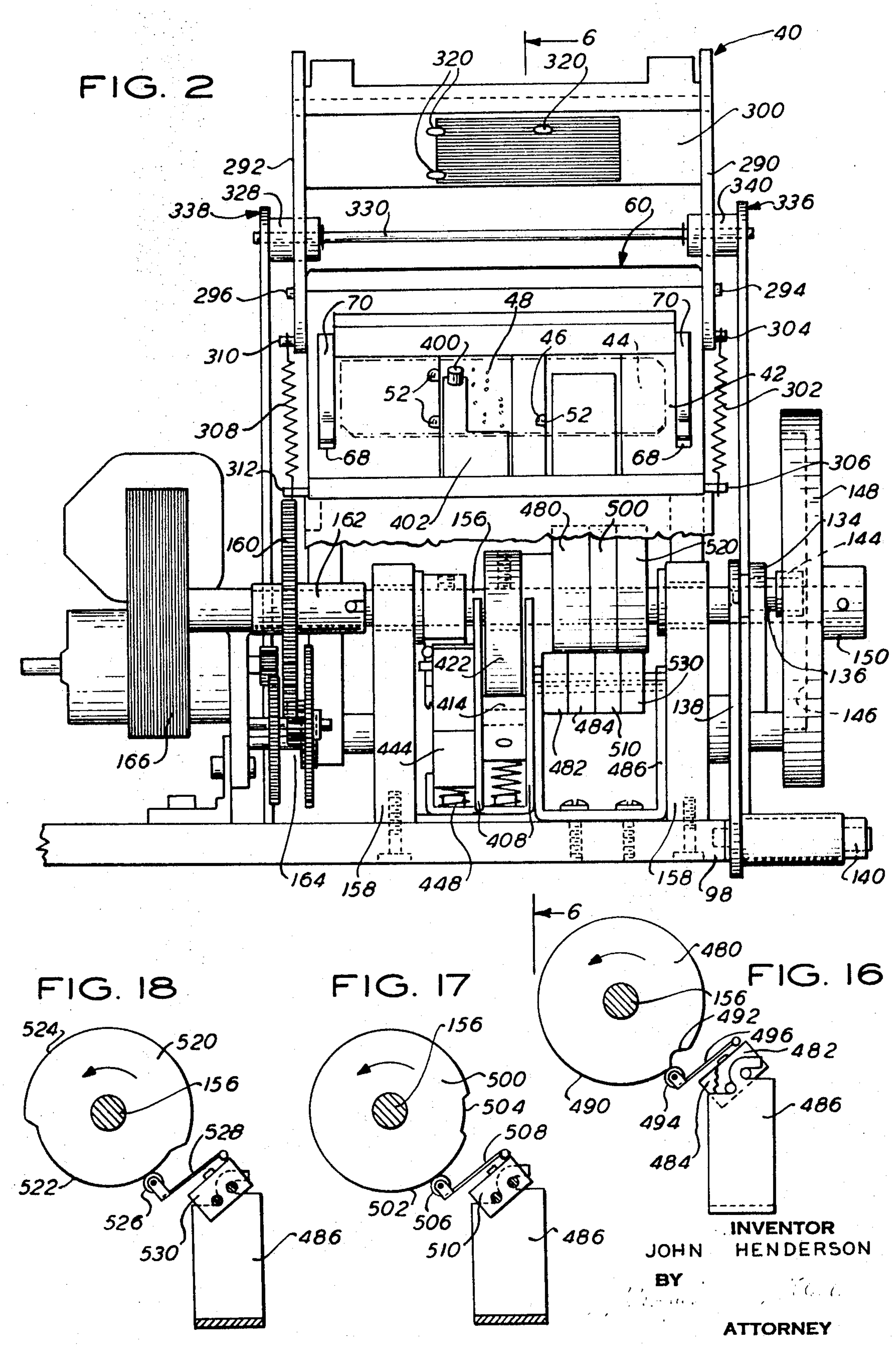
FIG. 2 is a front elevational view of the record reading unit of the device of FIG. 1 removed therefrom to better shown the details thereof.
FIGS. 16, 17 and 18 are schematic views of cams and associated switch structure for the record reading unit of FIG. 2.

In FIG. 1 there is generally shown at 30 an information gathering unit which includes a magnetic tape recorder 32 housed in a drawer 34 and interconnected by suitable electronics and circuitry to a keyboard unit 38 and a record reader 40 (FIGS. 1 and 2).

Magnetic tape recorder 32 is of the type currently marketed by Digitronics Corporation under the trademark DATA VERTER Digital Recorder-Model 900. The keyboard unit is of the type currently marketed by Digitronics Corporation under the trademark Data-Verter Adding Machine-Model No. 706, and includes a printer (not shown) which provides a paper tape output as shown at 42.

Record reader 40 is adapted to receive and read tags and tokens 44 of the type more generally shown in U.S. Pat. No. 2,692,083granted on Oct. 19, 1954 to A. K. Marsh. A plurality of apertures 46 (FIGS. 2 and 3) formed in tag 44 when perforated indicia 48 are recorded therein serve, when positioned on pins 52 (FIGS. 1 and 3) carried by a tag holder 54 (FIGS. 3 and 4), to properly locate tag 42 for subsequent processing by record reader 40.

Figure 3:
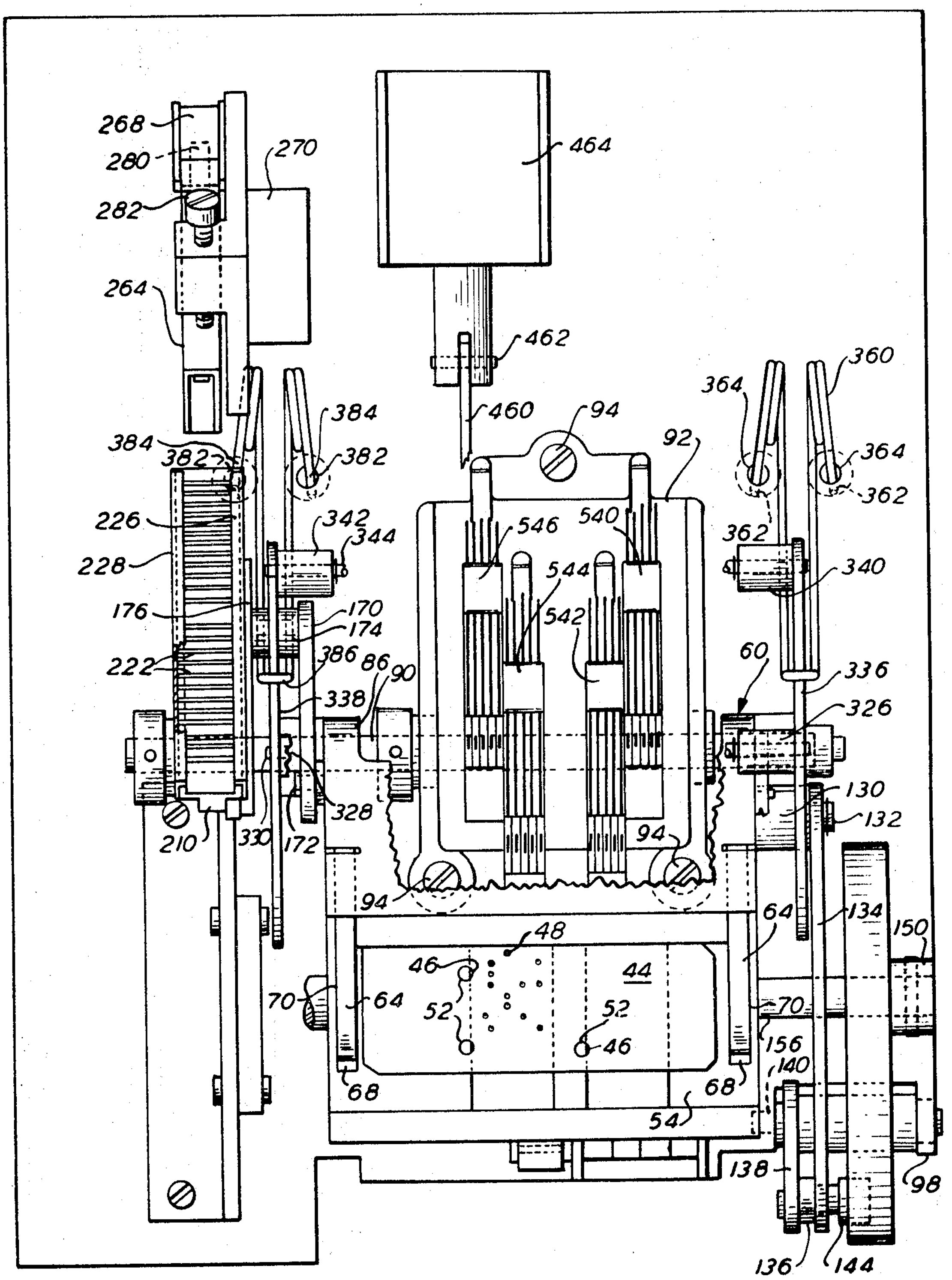
FIG. 3 is a top view of the unit of FIG. 2.
Figures 4, 5:
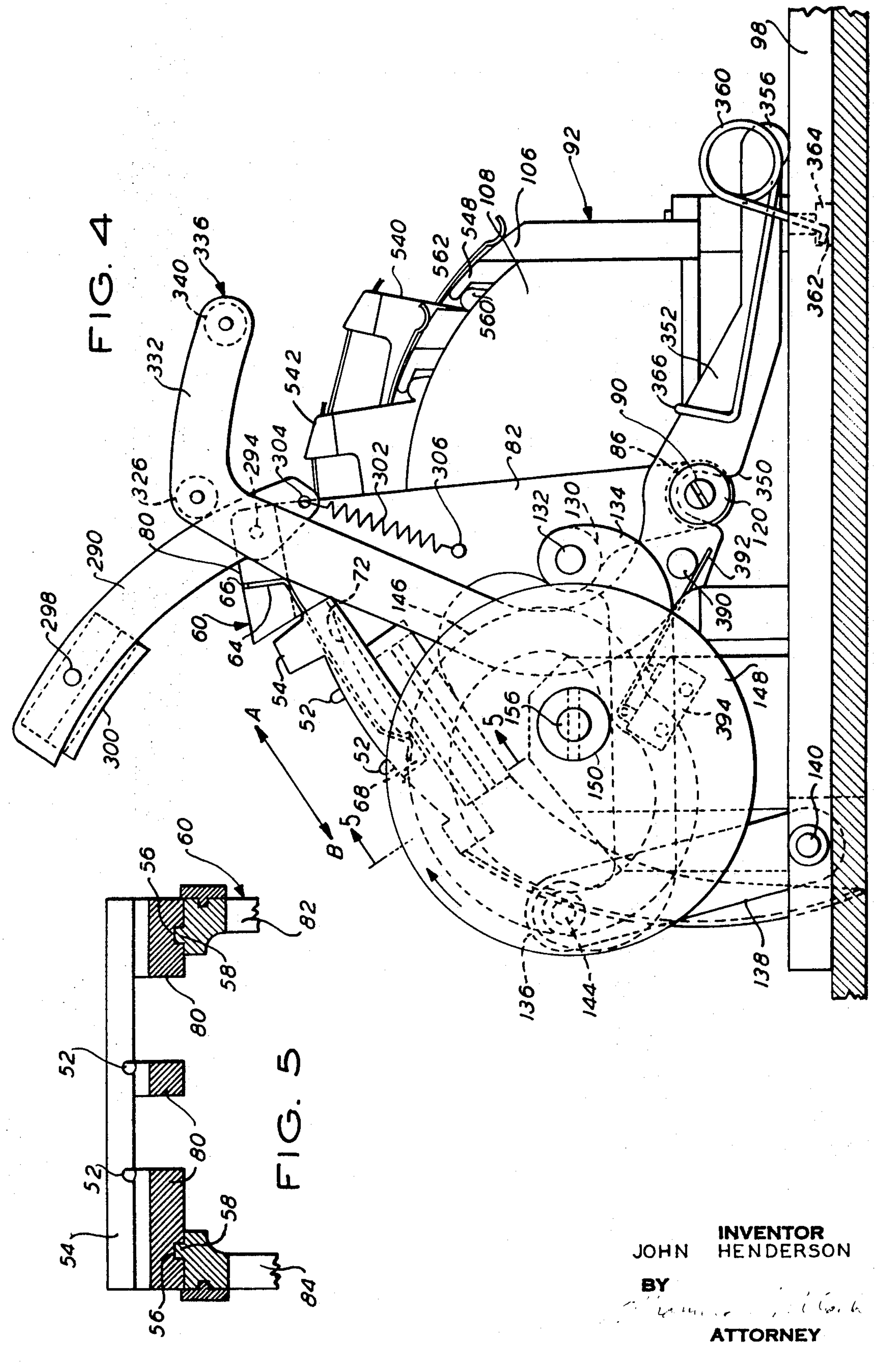
FIG. 4 is a right elevational view of the unit of FIG. 2.
FIG. 5 is a sectional view taken on line 5—5 of FIG. 4.

A pair of grooves 56 (FIG. 5) are formed in the bottom surface of tag holder 54 for coaction with a pair of ribs 58 formed on the upper surface of a yoke 60 (FIG. 3 and 4). A pair of leaf springs 64 (FIG. 3) are each formed with a mounting end adapted to seat in grooves 66 (FIGS. 4 and 7) formed in the outer walls of yoke 60, and a nose end adapted to seat in a recessed portion 68 of a spring slot 70 (FIG. 3) formed in the upper surface of tag holder 54. A ramp 72 (FIG. 4) is formed in each spring slot 70 at the end thereof opposite recessed portion 68 to facilitate the removal of tag holder 54 from yoke 60 and the replacement of tag holder 54 on yoke 60.

Figure 6:
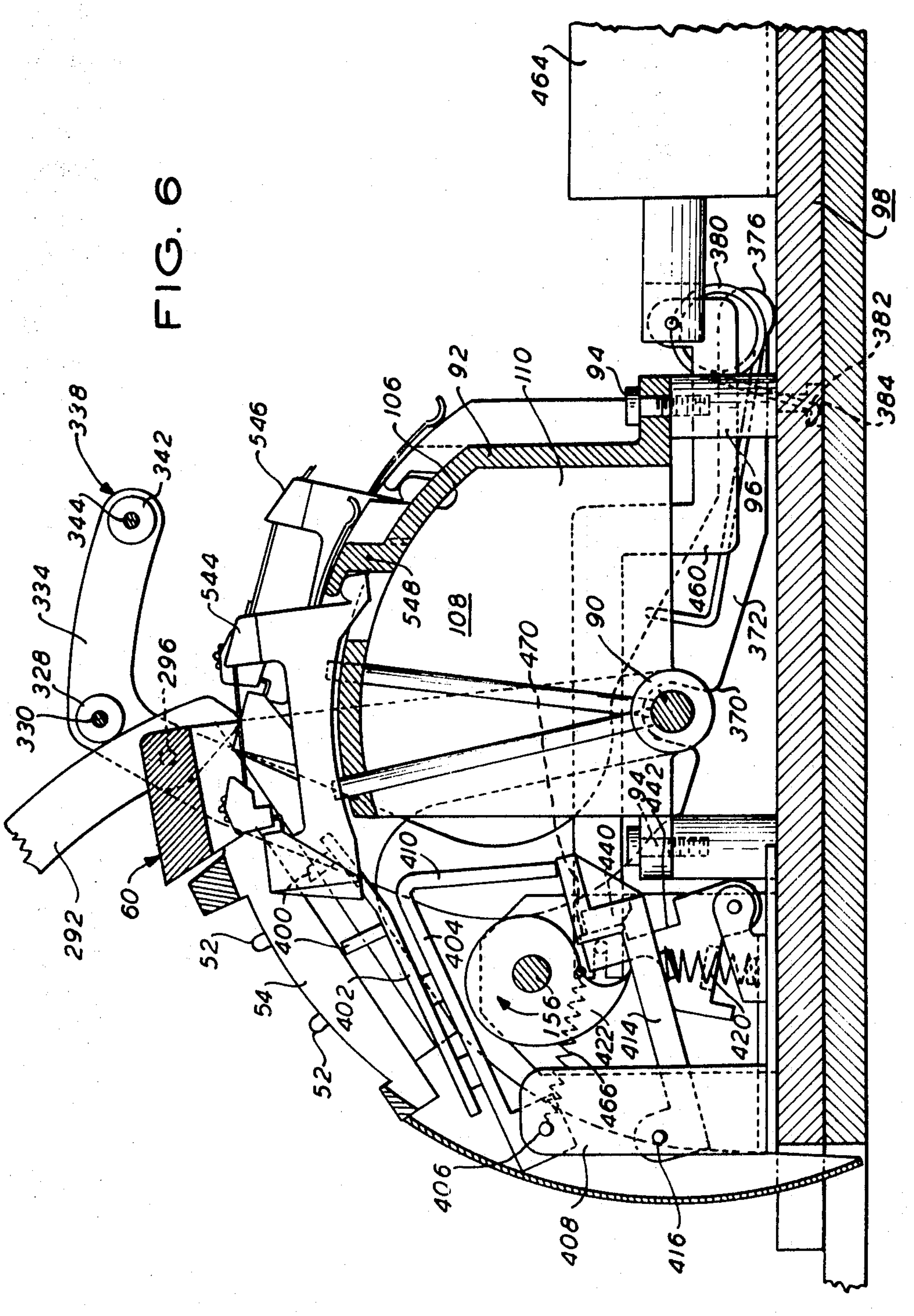
FIG. 6 is a sectional view taken on line 6—6 of FIG. 2.
Figure 7:
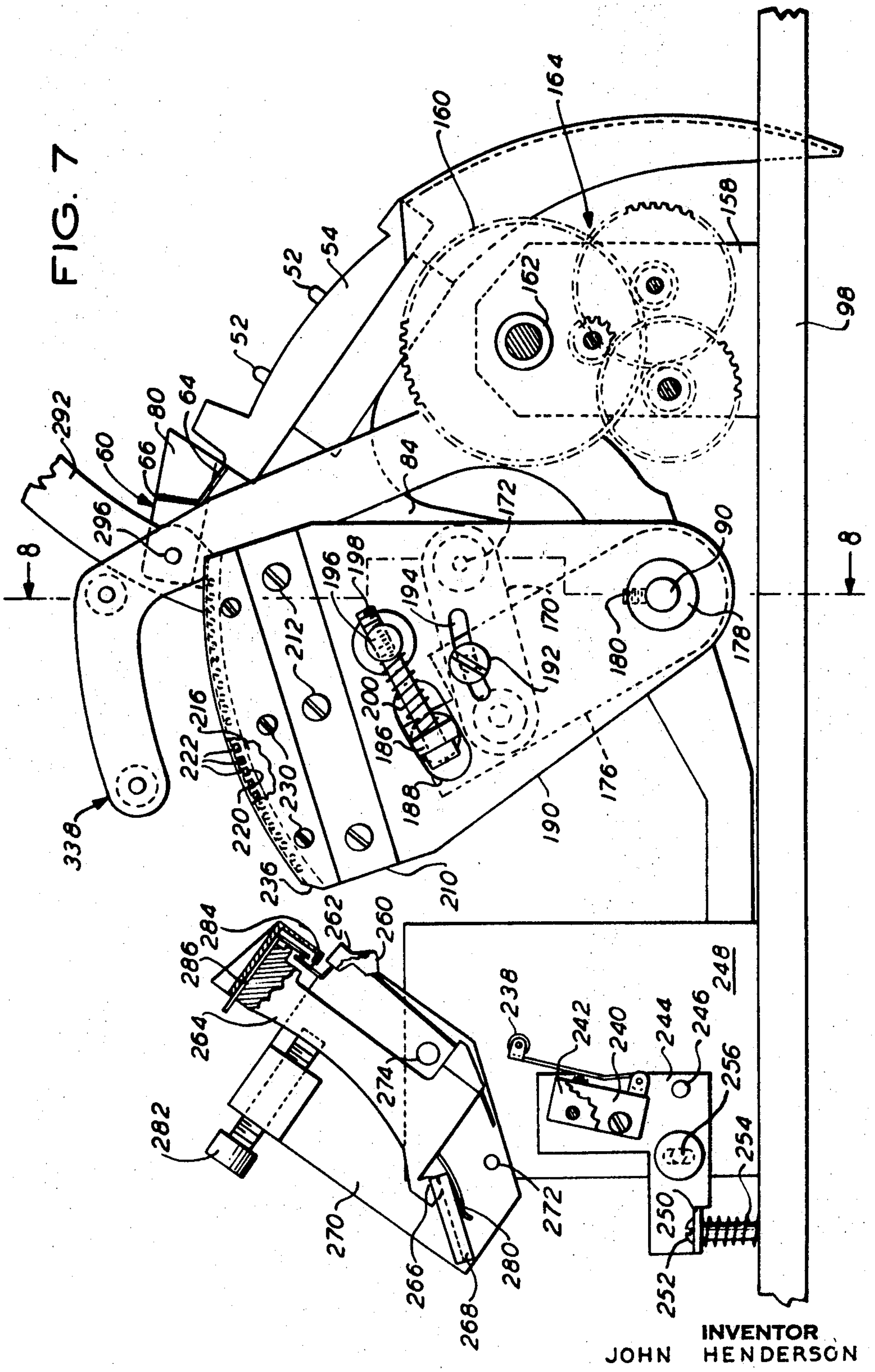
FIG. 7 is a left elevational view of the unit of FIG. 2.
Figures 8, 12:
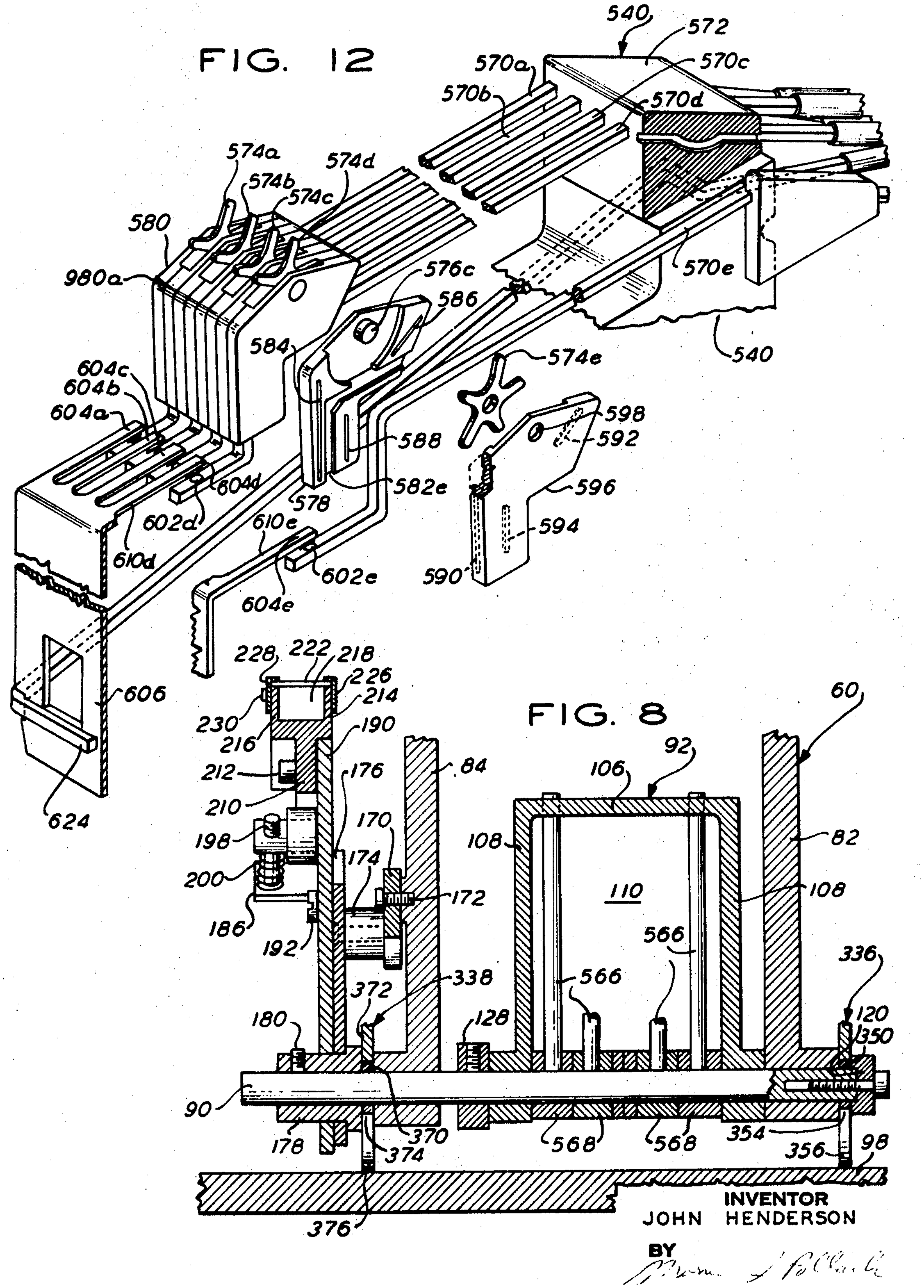
FIG. 8 is a sectional view taken on line 8—8 of FIG. 7.
FIG. 12 is an enlarged isometric view, partially exploded, of a star wheel sensing assembly of the reader of FIG. 2.

Yoke 60 (FIGS. 4 and 5) is substantially U-shaped in configuration and includes a crosspiece 80 spanning a downwardly extending right arm 82 and left arm 84 (FIG. 7). An enlarged end 86 (FIG. 4) formed on arms 82 and 84, is provided with an aperture to receive a pivot shaft 90 journaled in a reader base 92 (FIG. 8). A plurality of threaded members 94 (FIG. 3 and 6) securely and fixedly position reader base 92 onto posts 96 (FIG. 6) which are fixedly disposed on a base plate 98. Reader base 92 is formed with a roof 106 (FIGS. 6 and 8) interconnecting a pair of spaced sidewalls 108 to form a hollow 110 therewithin.

An end collar 120 (FIGS. 4 and 8) secured to the right end of shaft 90, and a mid-shaft collar 128, secured near the middle of shaft 90, accurately position shaft 90 with respect to reader base 92 and yoke 60.

A boss 130 (FIGS. 3 and 4), extending outwardly from right arm 82 of yoke 60, carries a stub shaft 132 upon which is rockably disposed one end of a link 134. The other end of link 134 is rockably disposed on a stub shaft 136 carried by cam follower arm 138 rockably journaled on a shaft 140 carried by base plate 98. A ball bearing type cam follower 144 carried on the end of stub shaft 136, is adapted to seat in a cam groove 146 (FIG. 4) of a drive cam 148 (FIGS. 12 and 4) eccentrically affixed by a hub 150 to a drive shaft 156 journaled in supports 158 (FIG. 2) carried by base plate 98. A drive gear 160 (FIG. 2), carried by a hub 162 secured to drive shaft 156, is disposed in mesh with a gear train 164, of a motor drive unit 166.

Energization of motor drive unit 166, from a suitable power source, will operate gear train 164 to drive gear 160 and drive shaft 156 in the clockwise direction about the axis of rotation of shaft 156 (FIG. 4). Rotation of drive shaft 156 drives cam 148 and due to the configuration of cam groove 146 transmits power through cam follower 144, stub shaft 136, cam follower arm 138, link 134, stub shaft 132, and boss 130 to drive yoke 60 in an arcuate path and in an oscillatory manner alternately in the directions of arrows A and B (FIG. 4).

A link 170 (FIGS. 7 and 8) fixedly secured as at 172 to left arm 84 of yoke 60, carries a boss 174 (FIG. 8) to which is secured a commutator mounting plate 176 carried by a hub 178 fixedly secured to shaft 90 by a set screw 180 (FIGS. 7 and 8). A shoulder 186 extends outwardly from commutator plate 176 through an elongated aperture 188 (FIG. 7) formed in a commutator plate 190 (FIGS. 7 and 8) rotatably journaled on hub 178. Plate 190 is adapted to be fixedly secured with respect to commutator mounting plate 176 by a screw 192 which passes through an elongated slot 194 (FIG. 7) to be threaded into commutator plate 176. A stub shaft 196, extending from commutator plate 190, is formed with an internally threaded aperture (not shown) to receive one end of an adjustment screw 198. The other end of adjustment screw 198 is received in an appropriately threaded aperture formed in shoulder 186. A spring 200, disposed around adjustment screw 198, is housed between stub shaft 196 and shoulder 186 to provide appropriate forces against stub shaft 196 and shoulder 186 to maintain a proper setting of adjustment screw 198.

A commutator cap 210 (FIGS. 3, 7 and 8) is secured by a plurality of screws 212 (FIGS. 7 and 8) to the upper portion of commutator plate 190. Commutator cap 210 is formed of electrically nonconductive material and is provided with a right sidewall 214 (FIG. 8) and a left sidewall 216 spaced from right side 214 to provide a trough 218 therebetween. The upper edges of right sidewall 214 and left sidewall 216 are each formed with a plurality of spaced notches 220 (FIG. 7) each adapted to receive a commutator pin 222. A right cap 226 (FIG. 8) is secured to right sidewall 214 as by a suitable adhesive or the like to retain commutator pins 222 in position thereon; while a left cap 228 is removably secured to left sidewall 216 through suitable threaded elements such as screws 230. The number of pins 222 and the location thereof may thus be varied at will by merely removing cap 228 and those pins 222 not required.

Once right cap 226 and left cap 228 have been initially positioned upon commutator cap 210 a cam ramp 236 (FIG. 7) is formed thereon for coaction with actuating wheels 238 (only one shown) of a pair of field switches 240 and 242. Switches 240 and 242 are fixedly secured to a mounting plate 244 pivotally mounted as at 246 to a standard 248 carried by base plate 98. A shoulder 250 is formed on mounting plate 244 for coaction with a threaded element 252 carried by base plate 98. A spring 254 surrounds threaded element 252 so as to be lodged between the shoulder 250 and base plate 98 exert an appropriate force upon mounting plate 244. A locking screw 256 extends through plate 244 and into standard 248 to lock plate 244 in its adjusted position.

Appropriate adjustment of threaded member 252 will relocate mounting plate 244 and field switches 240 and 242 with respect to ramps 236 of commutator cap 210. Releasing locking screw 192 permits adjustment screw 198 to be operated to move commutator plate 190 with respect to commutator mounting plate 176. Relocking of screw 192 secures the adjustment. Adjustment of the position of commutator plate 190 relocates ramps 236 with respect to field switches 240 and 242; as well as the position of commutator pins 222 with respect to a pair of commutator sensing noses 20 and 262 of a commutator switch 264 (FIGS. 3 and 7).

Commutator switch 264 pivots on a pair of feet 266 (FIG. 7) resting on a surface 268 formed on a mounting plate 270 fixedly pinned at 272 and 274 to standard 248. A spring 280 biases commutator switch 264 in a counterclockwise direction about feet 266 and into engagement with an adjustment screw 282 to facilitate proper disposition of noses 260 and 262 with respect to commutator pins 222. Noses 260 and 262 respectively cooperate with a pair of normally closed contacts 284 and 286 such that the engagement of a nose 260 or 262 with a commutator pin 222 effects disengagement of switch contacts 284 and 286 to open the circuit. Commutator switch 264 is electrically connected along with field switches 240 and 242 into the circuitry of reader 40 as will be hereinafter described.

Figure 9:
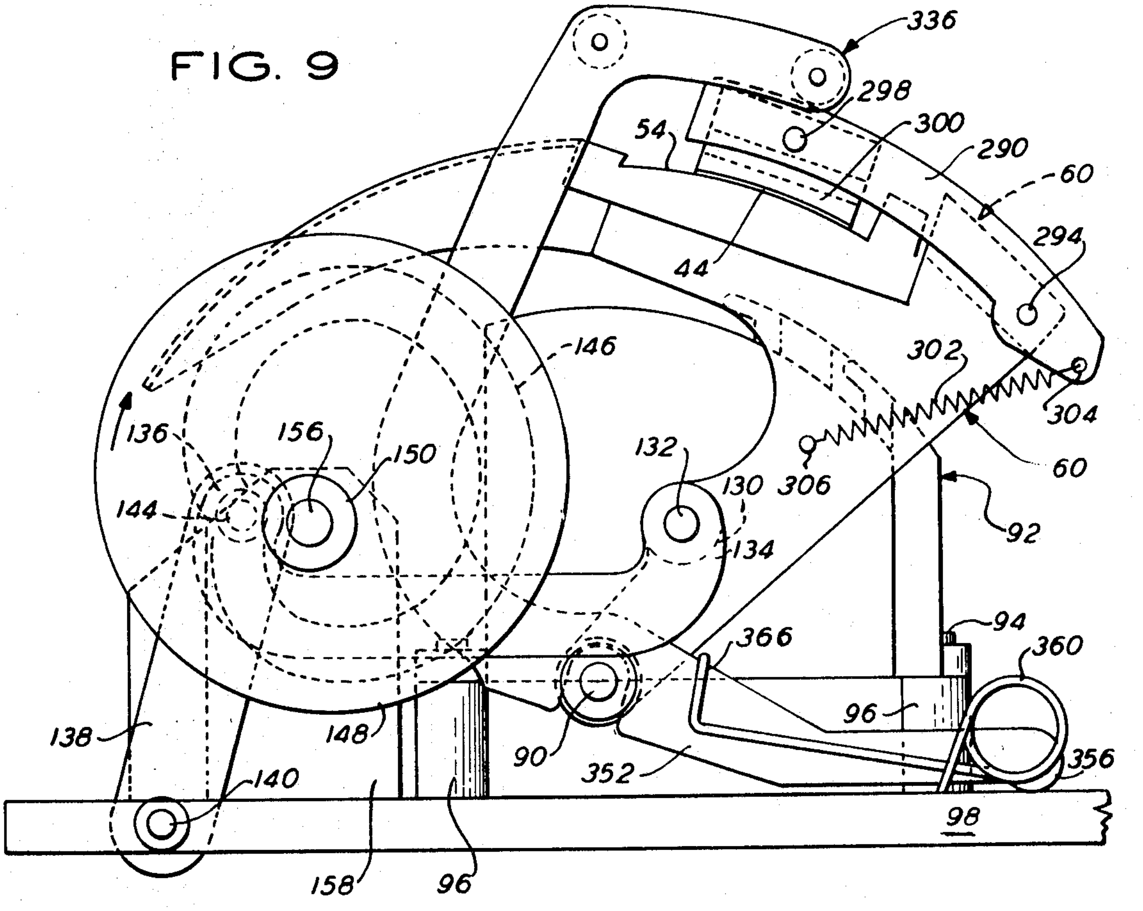
FIG. 9 is a view similar to FIG. 4 but showing the reader in midcycle position.
Figure 10:
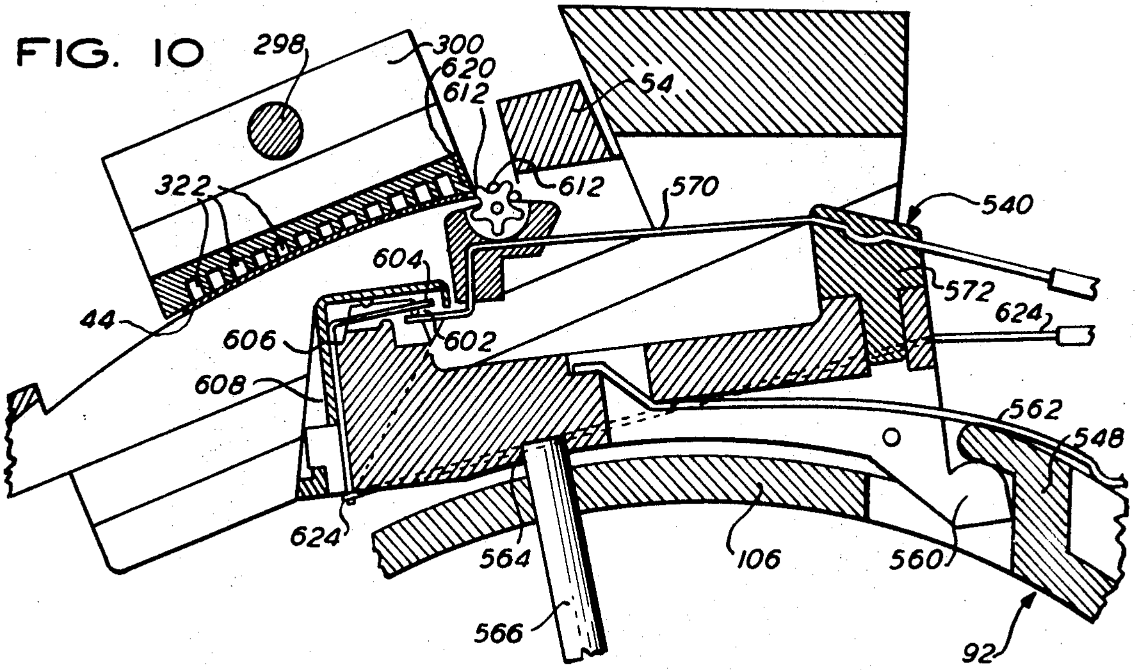
FIG. 10 is an enlarged sectional view of the star wheel sensing assembly in position on the record reader of FIG. 2 and at the beginning of a reading cycle.

A pair of record clamp arms 290 (FIGS. 2 and 4) and 292 (FIGS. 2 and 7), pivotally mounted at 294 (FIG. 4) and 296 (FIG. 7) respectively to yoke 60, loosely and rockably mount therebetween, on a rockshaft 298 (FIGS. 1 and 9), a record clamp 300. A clamp spring 302 (FIGS. 2 and 9) has one of its ends connected at 304 to clamp arm 290 and the other of its ends connected at 306 to right side 82 of yoke 60. A clamp spring 308 (FIG. 2) has one of its ends connected at 310 to clamp arm 292 and its other end connected at 312 to left side 84 of yoke 60. Three apertures 320 (FIG. 2) are formed in clamp 300 to provide clearance for locating pins 52 of tag holder 54 when clamp 300 is in the record sensing position as shown in FIGS. 9 and 10. A plurality of grooves 322 (FIGS. 10 and 11) are formed in clamp 300 for purposes to be hereinafter described.

Clamp 3000 and its arms 290 and 292 are interconnected through rockshaft 298 and pivots 294 to 296 so as to provide a wobbly assembly wherein clamp 300 is permitted a limited degree of rocking motion about shaft 298; and wherein arms 290 and 292 may pivot independently of each other to a limited degree about their respective pivots 294 and 296. The construction facilitates the proper clamping of a record upon record holder 54 and provides for a proper distribution of pressure thereupon.

The upper edges of arms 290 and 292 are disposed respectively for coaction with a pair of clamp rollers 326 (FIGS. 3 and 4) and 328 (FIGS. 3 and 6) carried by a clamp roller shaft 330 spanning upper arms 332 and 334 respectively of clamp roller carriers 336 and 338. An additional pair of clamp rollers 340 and 342 are carried by a shaft 344 also spanning upper arms 332 and 334 of clamp roller carriers 336 and 338.

A recess 350 (FIGS. 4 and 8), formed in a lower arm 352 of carrier 336, is journaled upon a reduced hub 354 (FIG. 8) of end collar 120; while a pivot end 356 of carrier 336 rests upon base plate 98. A carrier spring 360 (FIGS. 3 and 4) has its ends 362 hooked into apertures 364 of base plate 98, and its center span 366 biased by its spring force against lower arm 352 of carrier 336; to urge carrier 336 in the counterclockwise direction about its pivot end 356 and against hub 354. A notch 370 (FIGS. 6 and 8), formed in a lower arm 372 of carrier 338, is journaled upon a reduced hub 374 (FIG. 8) of hub 178 of commutator mounting plate 176; while a pivot end 376 of lower arm 372 rests upon base plate 98. A carrier spring 380 (FIG. 6) has its ends 382 hooked into apertures 384 of base plate 98 and its center span 386 biased by its spring force against lower arm 372 of carrier 338 to urge carrier 338 in a counterclockwise direction (FIG. 6) about its pivot end 376 and against hub 374.

A lug 390 (FIG. 4) extends out from lower arm 352 of carrier 336 to engage a blade 392 of a microswitch 394 so as to render the switch contact therein closed. Any rotation of carrier arm 336 in the clockwise (FIG. 4) direction about its pivot end 356 will result in a lifting of blade 392 and an opening of the contacts of switch 394. Such rotation of carrier arm 336 will result if any unduly thick object, such as a crumpled tag or an operator's finger, is placed between record holder 54 and clamp 300 and remains there as yoke 60 is driven in the clockwise direction about the axis of rotation of its shaft 90. Due to the obstruction clamp 300 will not be able to close completely and arms 290 and 292 thereof will act upon carrier rollers 326 and 328 to rock carrier arm 336 in its clockwise direction about its pivot 356. Even if the object is over to the left (FIG. 3) of holder 54 the interconnection between arm 338 and arm 336 through shafts 330 and 344 will be sufficient to effect a clockwise movement of carrier arm 336 and subsequent deactivation of microswitch 394. Carrier springs 360 and 380 will, upon removal of the obstruction, move arms 336 and 338 respectively in the counterclockwise direction (FIG. 4) about their pivot ends 356 and 376 to return lug 390 against blade 392 to close the contacts within microswitch 394.

Figure 14:
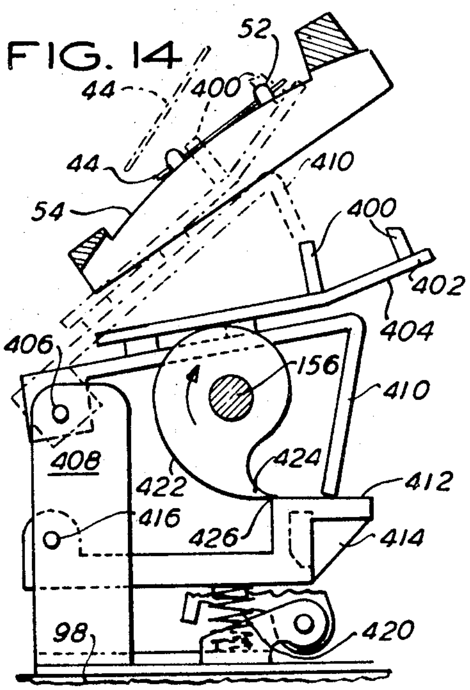
FIG. 14 is a right side elevational view, partly in section, of a portion of the record reading unit of FIG. 2 showing the record ejection mechanism.

Below holder 54 (FIG. 6 and 14) there is normally disposed a plurality of record eject lugs 400 which extend upwardly from a plate 402 secured to a tag ejector 404 pivotally mounted as at 406 (FIG. 14) between a pair of brackets 408 fixedly secured to base plate 90 (FIG. 2). An arm 410 extends downwardly from tag ejector 404 into proximity with an upper shoulder 412 of an ejector actuator 414 pivotally mounted at 416 to brackets 408. A spring 420 urges ejector actuator 412 in the counterclockwise direction about pivot 416 (FIG. 14) to place shoulder 412 of ejector actuator 414 in proximity to an ejector cam 422 driven by main drive shaft 156. The action of the elements is such that as cam 422 is driven in the clockwise direction (FIG. 14) about the axis of rotation of drive shaft 156 it engages shoulder 412 and rocks ejector actuator 414, against the action of spring 420, in a clockwise direction about pivot 416. Arm 410, due to the effects of gravity, follows shoulder 412 of ejector actuator 414 and thus tag ejector 404 and ejector lugs 400 move in a clockwise direction about pivot 406 from the position shown therefore in FIG. 6 to the solid line position thereof in FIG. 14. As the tip 424 of cam 422 passes over edge 426 of ejector actuator 414 spring 420 drives ejector actuator 414 in a counterclockwise direction about pivot 416. Shoulder 412 of ejector 414 thus moves against arm 410 driving ejector 404 and ejector lugs 400 in the counterclockwise direction about pivot 406. Before the force thus applied to ejector 404 dissipates lugs 400 thereof will have struck tag 44 lifting same off of locating pins 52 so that tag 44 can drop into a trough 430 (FIG. 1) provided therefore. Tag ejector 404 will thereafter, due to the effects of gravity, rotate in the clockwise direction (FIG. 14) about its pivot 406 until arm 410 thereof again strikes shoulder 412 of ejector actuator 414.

Figure 15:
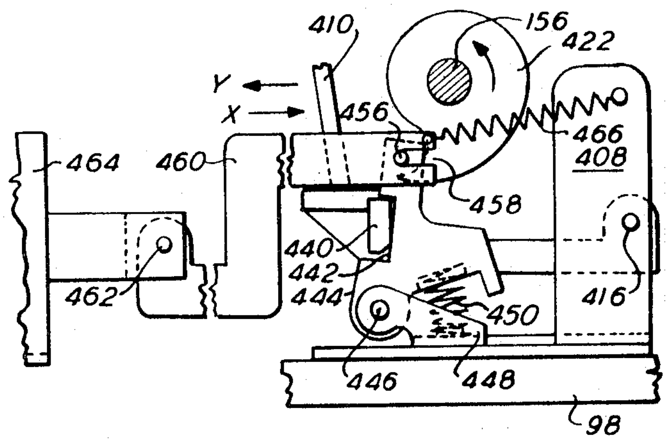
FIG. 15 is a left side elevational view of the mechanism for nullifying the operation of the record ejection mechanism of FIG. 14.

A latch lug 440 (FIGS. 6 and 15) extends out from ejector actuator 414 for coaction with a notch 442 (FIG. 15) formed in an ejector latch 444 pivotally mounted as at 446 to a bracket 448 carried by base plate 98. A spring 450 urges latch 444 in the counterclockwise direction about pivot 446 (FIG. 15) until a pin 456 extending outwardly from latch 444 seats at the bottom of a slot 458 of a solenoid arm 460 connected as at 462 to a solenoid 464 carried by base plate 98. A spring 466 (FIG. 15) connected at one of its ends to arm 460 of solenoid 464 and the other of its ends to bracket 408 draws solenoid arm 460 in the direction of arrow X (FIG. 15).

Solenoid 464 is interconnected in the circuitry of the system, as will be hereinafter described, in such a manner that upon generation by the system of an error signal solenoid 464 will be energized and will draw arm 460 in the direction of arrow Y and against the action of spring 466. As the bottom of slot 458 moves away from pin 456 of latch 444 spring 450 thereof rocks latch 444 in the counterclockwise direction about its pivot 446. This action usually occurs about that point in the cycle when cam 422 has driven ejector actuator 414 to a position wherein it is about ready to act on arm 410 and tag ejector 404 to eject a tag 44 from holder 54. The action of spring 448 upon latch 444 results in lug 440, of ejector actuator 414, seating in notch 442 of ejector latch 444. As tip 424 of ejector cam 422 passes over edge 426 of ejector actuator 414 spring 420 will attempt to move ejector actuator 414 in the clockwise direction of its pivot 416 (FIG. 15), but lug 440 of ejector actuator 414 will be trapped in notch 442 of latch 444. Ejector actuator 414 will thus be unable to act upon arm 410 and tag ejector 404 to eject tag from tag holder 54. It will thus be obvious to the operator that the system has refused to accept the information encoded upon the tag and the operator will have to take appropriate action; such as keying the information in through keyboard 38. Ejector cam 422 will thereafter complete its rotation under actuation of drive shaft 156. If solenoid 464 releases latch 444 before notch 442 of ejector actuator 414 is in position to receive lug 440 of the action of spring 448 will maintain lug 440 in engagement with surface 470 (FIG. 6) of ejector actuator 414, without interfering with the operation of ejector actuator 414, until ejector actuator 414 has pivoted a sufficient distance for lug 404 to move into notch 442.

There is also fixedly disposed on main drive shaft 156 a motor and interlock cam 480 (FIGS. 2 and 16) disposed for coaction with a motor microswitch 482 and an interlock microswitch 484 carried by a substantial U-shaped bracket 486 secured to base plate 98. Cam surface 490 and its notch 492 coact with follower rollers 494 (only one shown) of microswitches 482 and 484 to operate blades 496 thereof. Microswitches 482 and 484 are interconnected into the circuitry, as will be hereinafter described, so that the contacts in microswitch 482 will be open when follower roller 494 thereof seats to notch 492, and so that the contacts in microswitch 484 will be closed when follower roller 494 thereof is seated in notch 492. Subsequent rotation of cam 480 by drive shaft 156 will thereafter close the contacts in microswitch 482 and open the contacts in microswitch 484 until cam 480 realigns notch 492 thereof with rollers 494 at which time the contacts in switch 482 will open and those in switch 484 will close.

An end of tag cam 500 (FIGS. 2 and 17) is fixedly secured on main drive shaft 156 adjacent motor and interlock cam 480. Cam surface 502 and notch 504 of end of tag cam 500 are disposed for coaction with follower roller 506 and blade 508 of an end of tag microswitch 510 such that the electrical contacts within switch 510 are closed when roller 506 is seated in notch 504 and are open when roller 506 is disposed against surface 502 of cam 500.

A commutator cam 520, fixedly disposed on main drive shaft 156 adjacent end of tag cam 500, is formed with a low cam surface 522 and a high cam surface 524 disposed for coaction with a follower roller 526 carried by a blade 528 of a double pole double throw microswitch 530, also carried by bracket 486. The coaction between cam surfaces 522 and 524 and blade 528 of microswitch 530 is such that when follower roller 526 coacts with lower cam surface 522 one set of contacts are closed and when follower roller 526 coacts with cam surface 524 the other set of contacts are closed. Motor microswitch 482, interlock microswitch 484, end of tag microswitch 510, and commutator microswitch 530 are all interconnected through suitable circuitry with sensing sets 540 (FIGS. 3, 4, and 12), 542 (FIG. 3), 544, and 546, all of which are carried on mounting lugs 548 (FIGS. and 6) extending upwardly from roof 106 of reader base 92. Since each sensing set 540, 542, 544, and 546 are of identical construction only one set will be described in detail. All the sets 540, 542, 544, and 546 are easily installed on reader base 92 by sliding a lug 560 formed on sensing set 540 beneath lug 548 of reader base 92, and by snapping a spring 562 carried by sensing set 540 over the top of lug 548 (FIG. 10). The positioning of sensing set 540 upon reader base 92 is completed by locating a recess 564, formed in the under surface of sensing set 540, over the top of a locating rod 566 which extends through the roof 106 of reader base 92. The lower end of rod 566 is disposed in a recess formed in a collar 568 loosely carried by shaft 90 (FIG. 8).

Five springlike electrically conductive contacts 570*a*, 570*b*, 570*c*, 570*d*, and 570*e* extend through block portion 572 of sensing set 540 (FIG. 12) and support therefrom in cantilever fashion five star wheels, 574*a*, 574*b*, 574*c*, 574*d* and 574*e*. Each star wheel 574 is rotatably supported upon a lug 576 formed in left side 578 of a star wheel housing 580. A groove 582 is formed in left side 578 to receive contact 570 while a plurality of grooves 584, 586 and 588 are formed on left side 578 for coaction with a plurality of ribs 590, 592, and 594 respectively of right side 596 of housing 580. An aperture 598 is also formed in right side 596 of housing 580 to receive lug 576. It will thus be seen that housing 580 can be secured together upon cantilevered contact 570 by disposing cantilever contact 570 in groove 582 and by proper positioning of ribs 590, 592 and 594 in grooves 584, 586 and 588 respectively. As such cantilever 570 rotatably supports star wheel 574 upon lug 576 of housing 580.

Figures 11, 13:
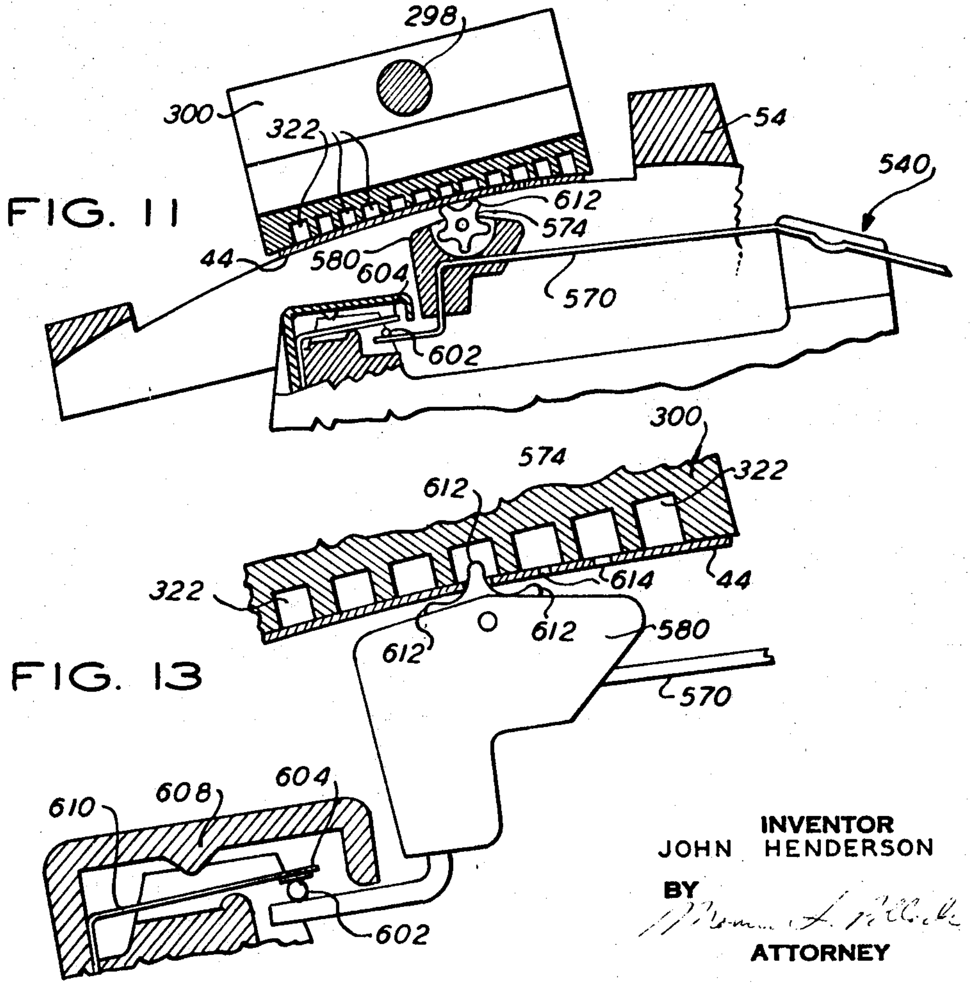
FIG. 11 is an enlarged sectional view of the star wheel sensing assembly showing a star wheel passing over an unperforated portion of the record.
FIG. 13 is a greatly enlarged sectional view of one of the star wheels as it senses a perforation in the record.

The spring action of cantilever contacts 570 *a*, *b*, *c*, *d*, and *e*, is such as to normally urge star wheels 574 *a*, *b*, *c*, *d*, and *e* into the position thereof shown in FIG. 10 wherein contact tips 602 of contacts 570 are engaged with contact tips 604 of a common contact 606 carried by sensing set 540 beneath a cap 608. Contact tips 604 *a, b, c, d,* and *e* are disposed at the extremities of contact fingers 610 *a, b, c, d,* and *e*. Fingers 610 are formed to yield when engaged by contact tips 602 to insure proper movement of star wheels 574 and proper seating of star wheel 574 when a tip 612 thereof extends through a perforation 614 in card 44. When there is no perforation in proximity to tips 612 of star wheel 574 adjacent tips 612 rest upon record card 44 as shown in FIG. 11. As tag holder 54 moves, record 44 carried thereby progresses across the top of star wheels 574.

As previously set forth cantilever contacts 570 normally urge star wheels 574 into the position thereof shown in FIG. 10 wherein tips 602 of contacts 570 are engaged with tips 604 of common contact 606 and wherein fingers 610 are flexed. As tag holder 54 begins its movement in the direction of arrow A (FIG. 4) an edge 620 of tag clamp 300 engages tips 612 of star wheels 574 to align tips 612 in a single row (FIG. 10). As tag clamp 300 passes over star wheels 574 it rotates them into the position shown in FIG. 11 wherein contacts 570 are flexed and tips 602 of contacts 570 are disengaged from contacts 604 of fingers 610 of common contact 606.

A common conductor 624 (FIG. 12) extends from common contact 606 around block portion 572 of sensing set 540 to be interconnected along with contacts 570 *a, b, c, d,* and *e* either directly or through a pluglike unit with the other circuitry and elements of record reader 40.

The operation of the information gathering unit 30 (FIG. 1) will be explained with reference to the schematic diagram of FIG. 19. It will be assumed that appropriate power is supplied to unit 30 through lines PS1 and PS2 so as to provide required power for tape recorder 32, keyboard unit 38, and record reader 40 as well as for the required logic 630. Logic 630 may be of conventionally available type to receive the information from sensing sets 540 (as will be hereinafter described) and transmit same to tape recorder 32, performing thereon various checks, such a parity checks, to determine that the information is proper and providing output signals, such as error signals in a manner and for the purposes to be hereinafter described.

The circuitry to motor drive unit 166 is open through the normally open contacts of motor microswitch 482 when follower roller 494 (FIG. 16) thereof is disposed in notch 492 of motor switch cam 480. A "Read" switch 634, which acts as a shunt around motor microswitch 482, is also in a normally open switch condition and therefore motor drive unit 166 remains inactive. Keyboard unit 38 is operative with the contact of interlock microswitch 484 normally closed as follower roller 494 thereof seats in notch 492 of cam 480. Appropriate magnetizible tape should be properly disposed in tape recorder 32 and tape recorder 32 should otherwise be ready to receive information from either keyboard 38, or record reader 40 through logic 630.

If the operator desires suitable header information may be placed upon the tape in it recorder 32 through keyboard unit 38 operators an appropriately perforated tag 44. In using keyboard 38 the operator depresses the appropriate keys and the information is accordingly placed upon the tape. If the header information has been set up on a tag 44 the operator enters such information in a manner similar to that used in entering information from any tag 44, as will now be described.

A tag 44 is placed upon tag holder 54 with apertures 46 (FIG. 2) of tag 44 upon locating pins 52 (FIG. 1). "Read" switch 634 is then depressed shunting power from PS1 and PS2 to motor drive unit 166. As power drive shaft 156 of motor drive unit 166 starts to rotate follower roller 494 of motor switch 482 moves out of notch 492 and onto cam surface 490 of motor cam 480 closing the circuit to motor drive unit 166. When "Read" switch 634 is thereafter released the power to motor drive unit 166 will be continuous. As motor and interlock cam 480 rotates follower roller 494 of interlock switch 484 moves out of notch 492 and onto cam surface 490 opening the circuit to keyboard unit 38 to prevent any input to tape recorder 32 from keyboard unit 38 while record reader 40 is in operation.

Rotation of drive shaft 156 through cam groove 146 of drive cam 148 transmits power to follower 144 (FIG. 4), stub shaft 146, link 134, stub shaft 132, boss 130 and left arm 82 of yoke 60 to drive yoke 60 from its home position (FIG. 4) in the direction of arrow A towards a midcycle position (FIG 9). As arms 290 and 292 of record clamp 300 move under clamp rollers 326 and 328 arms 290 and 292 are pivoted against the action of springs 302 and 308, in the counterclockwise direction about connection 304 (FIG. 4). Clamp 300 moves down upon tag holder 54 so that apertures 320 of clamp 300 seat about locating lugs 52 of holder 54 and tag 44 is thus securely clamped in position on holder 54.

If tag 44 presents an unduly thick object to clamp 300, such as if it were rolled up or if the operators fingers inadvertently remain between clamp 300 and holder 54 when the unit is moving towards it midcycle position, tag clamp arms 290 and 292 will act upon clamp rollers 326 and 328 to rock clamp roller carriers 336 and 338 in the clockwise direction (FIG. 4) about pivot end 356. Lug 390 on clamp roller carrier 336 will move away from blade 392 of microswitch 394 opening the contacts thereof disconnecting motor drive unit 166 from PS1 and PS2 and terminating operation thereof. When the obstruction is removed springs 360 (FIG. 4) and 380 (FIG. 6) will rock clamp roller carriers 336 and 338 in the counterclockwise direction about pivot end 356 moving lug 390 against blade 392 to close the contacts in microswitch 394 and restore power from PS1 and PS2 to motor drive unit 166. The operation of record reader 40 will thereafter continue.

As edge 620 (FIG. 10) of clamp 300 approaches star wheel tips 612 of star wheels 574 of sensing unit 540 it aligns same to facilitate movement of star wheels 574 in proper order beneath the tag 44. As star wheels 574 move beneath tag 44 they effect a rocking movement of cantilever contacts 570 *a, b, c, d,* and *e* to move contacts 602 *a, b, c, d,* and *e* thereof away from contacts 604 *a, b, c, d,* and *e* of spring fingers 610 *a, b, c, d,* and *e* of common contact 606. As star wheel tips 612 encounter the first column of information on tag 44 one or more wheels 574 will rotate about their respective mounting lugs 576; and under the spring bias of their respective cantilever contacts 570 will move through the perforation 614 into tag 44 and groove 322 of clamp 300. This action will result in contact between contacts 602 thereof and the associated contacts 604 of spring fingers 610 of common contact 606. Due to the bias of cantilever contacts 570 and the compliant nature of spring fingers 610 proper seating of tips 612 in perforations 614 of tag 44 is insured (FIG. 13). If spring fingers 610 were not formed to be compliant so as to yield under the bias of cantilever contacts 570 it would be very possible that tips 612 would not fully seat in perforations 614 of tag 44 and adjacent tips 612 might not move into perforations 614 in adjacent or subsequent positions on tag 44. Such action could easily result in an improper reading of the tag 44. The compliant nature of spring fingers 610, however, insures proper seating and proper reading of the information on tag 44.

With the closure of contacts 602 and 604 there is a flow of current through conductor 640, contacts of switch 530, conductor 642, contacts of switch 242, conductor 644 and those contacts 604 engaged with a contact 602. Concurrently with this operation noses 260 and 262 (FIG. 7) of commutator switch 264 are coacting with pins 222 of commutator cap 210 to open contacts 284 and 286, in strobelike fashion, to provide clocking pulses to logic 630. Only sensing set 540 is operative at this time. Sensing sets 542, 544, and 546 remain inoperative.

Figure 19:
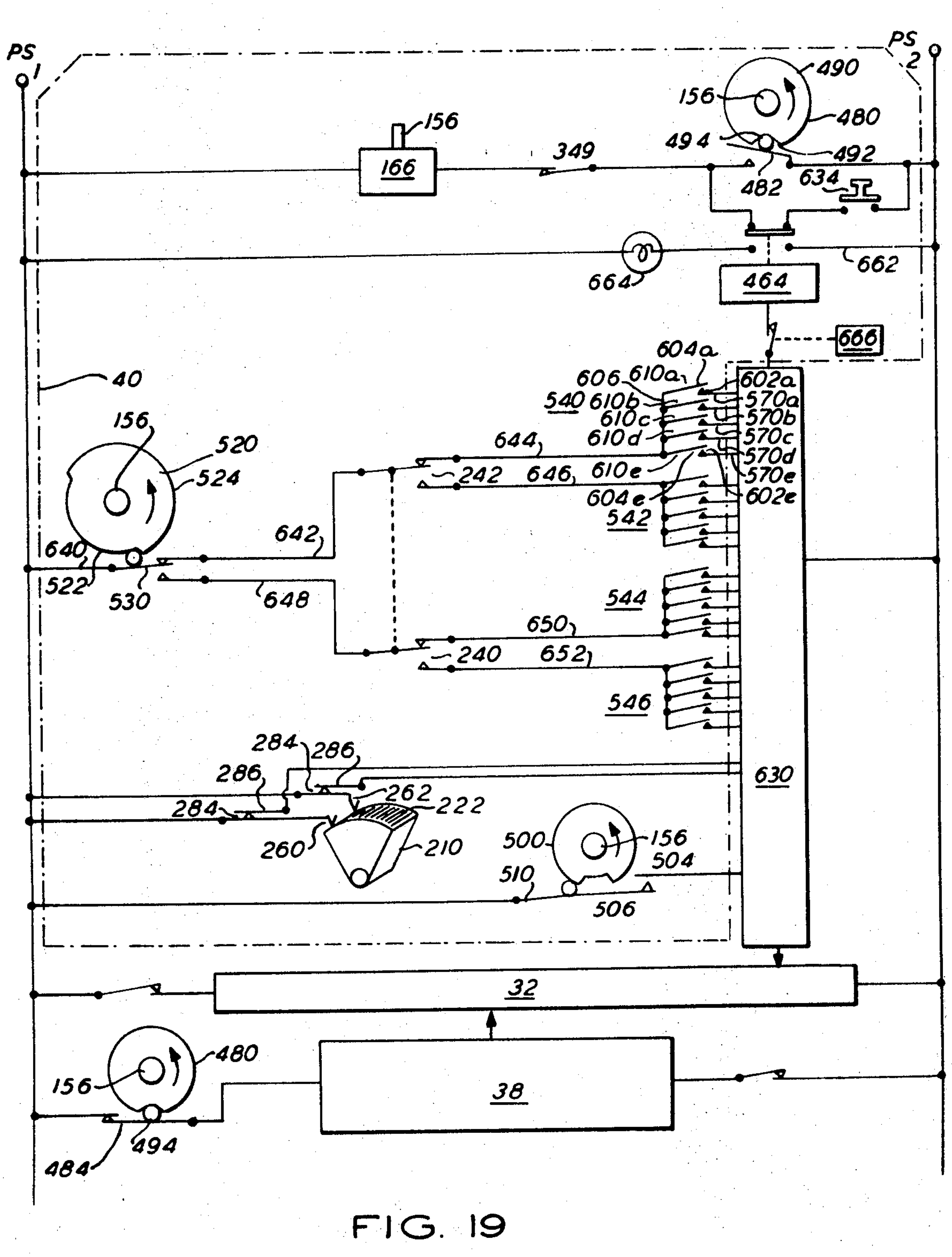
FIG. 19 is a schematic diagram of the circuitry for the record reader and system of FIG. 1.

When yoke 60 has been driven to a position midway between its at-home position (FIG. 4) and its midcycle position (FIG. 9) follower rollers 238 of switches 240 and 242 (FIG. 7) move up ramps 236 on commutator cap 210 to change the position of the contacts in switches 240 and 242 and interconnect conductor 642 to a conductor 646 (FIG. 19)

so that sensing set 542 becomes operative and sensing set 540 becomes inoperative. Sensing sets 544 to 546 remain inoperative. The sensing of the perforations 614 in tag 44 continues as previously described for the second field of tag 44 through sensing set 542 until yoke 60 assumes its midcycle position (FIG. 9) at which time the direction of movement thereof is reversed and yoke 60 moves in the direction of arrow B (FIG. 4).

Concurrently with the reversal in direction of movement of yoke 60 cam surface 524 of cam 520 moves the contact of switch 530 into engagement with a conductor 648 rendering sensing set 542 inoperative and sensing set 544 operative through conductor 640, switch 530, conductor 648, switch 240, and a conductor 650. Sensing sets 540, 542, and 546 are now inoperative. When yoke 60 is midway between its midcycle position (FIG. 9) and its home position (FIG. 4) follower rollers 238 of switches 240 and 242 move down ramps 236 and off of commutator cap 210 shifting the contacts in switches 240 and 242 to bring the contact in switch 240 into engagement with a conductor 652 rendering sensing set 546 operative and sensing sets 544, 542 and 540 inoperative. As the end of the cycle approaches and yoke 60 moves toward its at-home position (FIG. 4) follower roller 506 of switch 510 (FIG. 17) moves into notch 504 of cam 500 sending a pulse of current to logic 630. Logic 630 in turn forwards information to tape recorder 32 to indicate that tag 44 has been read. Subsequent rotation of cam 500 moves follower 506 out of notch 504 terminating the pulse.

During the last phases of the cycle, ejector cam 422 coacts with ejector actuator 414 moving same in the clockwise (FIG. 6) direction about pivot 416 and against the action of spring 420. Arm 410 of tag ejector 404 and lugs 400 of ejector 404 follow ejector actuator 414 so that near the end of the cycle ejector actuator 404 is about in the position shown in FIG. 14. As tip 424 of cam 422 moves off of edge 426 of shoulder 412 of ejector actuator 414 spring 420 thereof moves ejector actuator 414 in the counterclockwise direction (FIG. 14) about pivot 416 driving arm 410, tag ejector 404, and ejector lugs 400 in the counterclockwise direction about pivot 406. Lugs 400 thereafter strike tag 44 flipping same off of holder 54 and into trough 430 (FIG. 1).

Motor cam 480 has now moved into a position wherein follower roller 494 drops into notch 492 thereon opening the circuit to motor drive unit 166 to terminate the cycle of operation thereof. Follower roller 494 of microswitch 484 has also moved into notch 492 of cam 480 again closing the circuit to keyboard 38. With tag 44 ejected from record reader 40 the operator knows that the information has been properly read. The next items of information can now be entered into tape recorder 32 either through keyboard 38 or record reader 40.

The operator can program the areas of tag 44 to be read by selecting the notches 220 of commutator 210 that are to contain pins 222 and by removing those pins 222 not so required.

If after the entire tag 44 has been read logic 630 determines that the information is in error there will be an output from logic unit 630 to tape recorder 32 indicating same and an output from logic unit 630 energizing ejector solenoid 464. As arm 460 of energized solenoid 464 moves in the direction of arrow Y (FIG. 15) and against the action of spring 466 inner end of slot 458 of arm 460 moves away from pin 456 of ejector latch 444. Spring 450 is now free to rock ejector latch 444 in the counterclockwise direction (FIG. 15) to capture lug 440 of ejector actuator 414 in notch 442. If ejector actuator 414 has not been moved to a position to permit capture of lug 440 in notch 442 lug 440 will engage surface 470 of ejector actuator 414 until ejector 414 has been moved to a position where lug 440 may be so captured. Subsequent movement of tip 424 of ejector actuator cam 422 past edge 426 of shoulder 412 of ejector actuator 414 will release ejector actuator 414 for movement in the clockwise direction (FIG. 15). However such movement will be prevented by lug 440 being captured in notch 442 of latch 444 and therefore operation of tag ejector 404 will be prevented and tag 44 will remain on holder 54 when yoke 60 has returned to its home position (FIG. 4). The error signal of logic 630 will also move a double throw switch 660 from its position shown in FIG. 19 to a position to close a circuit 662 to an error light 664. The operation of error light 644 and the fact that tag 44 remains on holder 54 at the end of the cycle will be an indication to the operator that the information has not been properly received by logic 630 and that such information should be entered into tape recorder 32 through the keyboard 38. At this time the operator will also be unable to operate record reader 40 through its switch 634 since the circuit is open through switch 660.

To reactivate record reader 40 the operator need only operate reset switch 666 deenergizing solenoid 464 and transferring switch 660 back to the position thereof shown in FIG. 19. When this happens error light 664 will be extinguished and solenoid arm 460 (FIG. 15) under the bias of its spring 466 will be moved in the direction of arrow X pivoting ejector latch 444 in the clockwise direction about pivot 446 and against the action of spring 450. This will return ejector latch 444 to the position thereof shown in FIG. 6.

From the above description it will thus be seen that a novel and improved information gathering system has been provided wherein a magnetic tape recorder is housed as an integral unit with and to receive information from a keyboard unit and a record reader; wherein the record reader incorporates a plurality of sensing sets each including a plurality of star wheels supported in cantilever fashion on conductive elements which coact with compliant contacts to insure proper seating of the star wheels as they sense perforated indicia in a record; wherein the record is clamped in a bowed condition and moves over the star wheels; wherein some of the information is sensed while the record is moving from a home position to a midcycle position and the remainder is read while the record moves from said midcycle position back to its home position; wherein when the record arrives at its home position it is automatically ejected from the reader unless the logic indicates that there has been an error; and wherein when there has been an error indication an appropriate indication thereof is placed on the magnetic tape, the operation of the ejector mechanism is halted, and the record reader is disabled so that the operator, takes cognizance thereof and enters such information through the keyboard.

It is understood that although I have shown the preferred form of my invention that various modifications may be made in the details thereof without departing from the spirit as comprehended by the following claims:

I claim:

1. A star wheel record reader comprising:

a. record holding means for holding a record-bearing perforate indicia;

b. at least one star wheel;

c. said star wheel being formed with a plurality of tips;

d. said star wheel being mounted so that upon relative movement between said star wheel and a record, when a record is carried by said record-holding means, two of said tips will engage and slide over the surface of the record until a perforation is encountered and so that one of said tips will enter an encountered perforation rotating said star wheel and permitting linear movement of said star wheel in a predetermined direction; and e. tip-aligning means coacting with the tips of said star wheel to align same prior to any coaction between said star wheel tips and a record.

2. The reader of claim 1 wherein said tip-aligning means constitutes an edge of a clamp which is moved into engagement with a record to clamp same in position on said record-holding means.

3. The reader of claim 1:

a. wherein there are a plurality of star wheels each formed with a plurality of tips; and b. wherein each star wheel is mounted so that its tips will slide over a record and enter a perforation to rotate the star wheel and permit said linear movement;

c. said tip-aligning means coating with the tips on said star wheels to align same prior to any coaction between said star wheel tips and a record.

4. The reader of claim 3 wherein said tip aligning means constitutes an edge of a clamp which is moved into engagement with a record to clamp same in position on said record holding means.

5. The reader of claim 2 wherein a. said record holding means includes a plurality of record locating pins; and b. said clamp includes a plurality of locating apertures which seat about said locating pins when said clamp is in position on said record holding means.

6. The reader of claim 5 wherein a. said record holding means is disposed for movement in a predetermined path with respect to said star wheel tips; and b. said clamp is moved into position on said locating pins during such movement and prior to any coaction with said star wheel tips.

7. The reader of claim 6 wherein said clamp is formed as a block of material mounted on said record holding means for movement therewith and with respect thereto.

8. The reader of claim 3 wherein said plurality of star wheels are arranged in groups with more than one star wheel in each group and wherein each successive group is displaced with respect to an adjacent group in a predetermined direction.

9. The reader of claim 8 wherein there are two groups of five star wheels.

10. The reader of claim 9 wherein there are four groups of five star wheels.

11. A reader for reading perforate indicia from a record comprising:

a. record holding means for holding a record and moving same in a predetermined path;

b. a plurality of star wheels each mounted rotatably and in cantilever fashion for coaction with a record when moved in said predetermined path;

c. each of said star wheels furthermore being formed with a plurality of tips and being biased towards said predetermined path so that when said tips encounter a record two of said tips will glide over the record surface until a perforation is encountered and so that when a perforation is encountered said bias will flex said cantilever mounting and move one of said tips into the perforation;

d. star wheel tip aligning means carried by said record holding means to strike said star wheel tips, prior to coaction of said tips with a record, and to line up said tips to facilitate proper coaction of said tips with the perforations in the record.

12. The reader of claim 11 a. wherein said aligning means includes a clamp mounted on said record holding means for movement therewith and with respect thereto to securely clamp a record thereon; and b. wherein an edge of said clamp engages said star wheel tips to align same.

13. The reader of claim 12;

a. wherein said record holding means mounts a plurality of locating pins for locating a record in proper position thereon; and b. wherein said clamp is formed with a plurality of locating apertures positioned for mating engagement with said locating pins.

14. The reader of claim 13 wherein said plurality of star wheels are arranged in groups with more than one star wheel in each group and wherein each successive group, in the direction of movement of said record holding means, is displaced a predetermined distance.

15. The reader of claim 14 wherein there are two groups of five star wheels.

16. The reader of claim 15 wherein there are four groups of five star wheels.

17. The reader of claim 14:

a. wherein said star wheel cantilever mounting is accomplished by disposing each star wheel on a flexible electrical conductor; and b. wherein said electrical conductor moves into engagement with an output conductor whenever a tip enters a perforation and out of engagement with said output conductor whenever two tips glide over a record.

18. The record reader of claim 13 wherein said clamp is carried by a pair of arms which are pivotally carried by said record holding means and which strike an abutment, during the initial movement of said record holding means, to bring said clamp down onto said record holding means.